J. W. MYERS,
Improvement in Feed Mills.

(57.)

No. 122,129.

Patented Dec. 26, 1871.

Witnesses.
R. H. Young
Ewell A. Dick

J. W. Myers
Inventor
By David A. Burr
Attorney

UNITED STATES PATENT OFFICE.

JOHN W. MYERS, OF LYONS CITY, IOWA.

IMPROVEMENT IN FEED-MILLS.

Specification forming part of Letters Patent No. 122,129, dated December 26, 1871.

I, JOHN W. MYERS, of Lyons, in the county of Clinton and State of Iowa, have invented certain Improvements in Metallic Grinding-Plates for Feed-Mills, of which the following is a specification:

The first part of my invention relates to the use of grinding-plates having cutting and grinding furrows, grooves, and lands cut or formed on each face thereof, and combined with a suitable inclosing-case and with an elastic packing placed within said case, the object of this part of my invention being to provide grinding-plates for small mills, which when worn upon one surface may be reversed, and a fresh surface be thus obtained without renewing the plate, and to provide for the protection of said plates. The second part of my invention relates to the combination of a fine-cut two-faced detachable annular grinding-plate with an outer compartment or recess in the casing containing the main grinding-plate, the object of this part of my invention being to provide the means for producing a finer comminution of the grain at pleasure, the diameter of the grinding-plates by the addition of an outer rim presenting an increased number of grooves and lands cut or formed to grind very finely.

Figure 1:
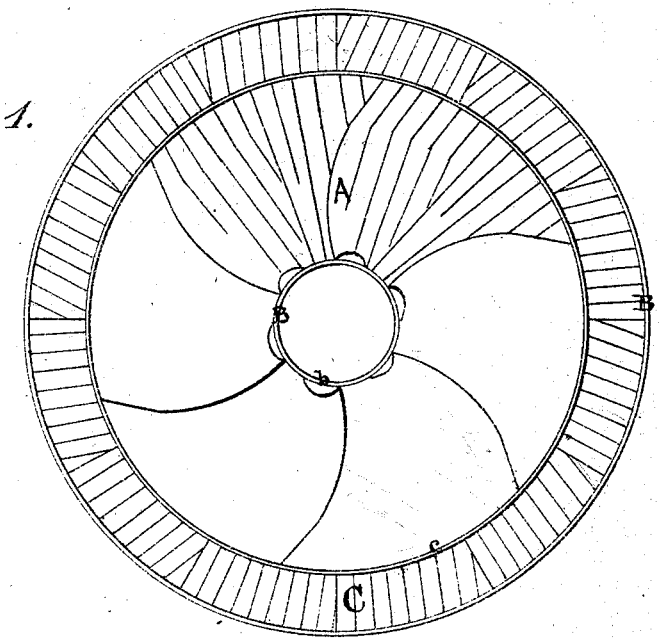
Figure 2:
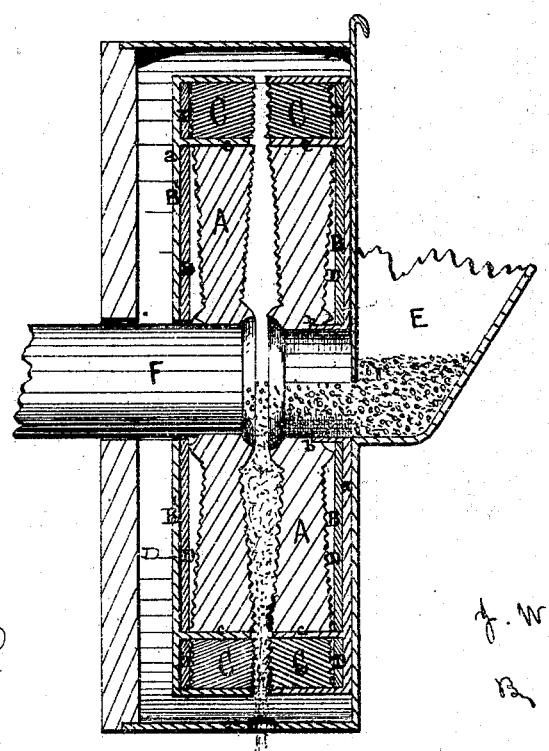

In the accompanying drawing, Figure 1 is a plan view of one of my improved reversible and extensible incased grinding-plates or metallic millstones, and Fig. 2 a diametric section illustrating a pair of the incased plates arranged in a mill.

A A are main grinding-plates. These consist of circular metallic disks of cast, chilled, or hardened metal, having suitable lands and grooves of approved pattern for grinding and crushing, formed in the usual manner not only on one but on both faces thereof, as seen in Fig. 2. B B' are metallic casings to receive and hold said plates. These casings consist each of an outer or bottom plate, $a$, having concentric flanges $b$ $c$ projecting therefrom to cover and embrace, respectively, the eye and rim of the grinding-plate. The casing is extended beyond the diameter of the main grinding-plate to receive and secure an outer detachable grinding-ring, and is fitted with a third flange, $d$, to inclose the same, as illustrated in the drawing. C C are annular grinding-plates of metal made to fit in the outer concentric compartment of the casings B B'. These grinding-rings or annular plates have suitable grooves and lands formed or cut on both faces of each suitable for grinding very fine, as illustrated in Fig. 1, and are designed to be used when it is desired to grind the grain much finer than can be accomplished with the main grinding-plates A A alone. D D are disks or cushions, of India rubber or other elastic material, fitted in the bottom of each compartment of the casings B B' to protect the under faces of the grinding-disks from contusion whilst the outer faces are at work, and also to provide an elastic bearing for the grinding-plates. The casings are secured, respectively, the one B to the frame carrying the hopper E so as to be fixed, and the other B' to a shaft, F, so as to revolve therewith, and the grain to be ground is fed in through the eye of the stationary casing and grinding-plate, as illustrated in Fig. 2.

I claim as my invention—

1. A reversible two-faced grinding-plate or disk, A, in combination with an inclosing casing, B, and an inclosed elastic cushion D, substantially as and for the purpose herein set forth.

2. An outer auxiliary detachable two-faced annular grinding-plate, C, in combination with a casing, B, inclosing a central grinding plate, A, and arranged to operate substantially as and for the purpose herein set forth.

J. W. MYERS.

Witnesses:
W. W. SANBORN,
EWELL A. DICK.

(57)